(12) United States Patent
Häfele et al.

(10) Patent No.: US 8,035,500 B2
(45) Date of Patent: Oct. 11, 2011

(54) METHOD AND DEVICE FOR ALLOCATING TRIGGERED TRANSMITTERS OF A TIRE MONITORING SYSTEM, ESPECIALLY OF A TIRE-PRESSURE MONITORING SYSTEM

(75) Inventors: Ulrich Häfele, Oberderdingen (DE); Mark Braun, Bretten (DE)

(73) Assignee: BERU Aktiengesellschaft, Ludwigsburg (DE)

( * ) Notice: Subject to any disclaimer, the term of this patent is extended or adjusted under 35 U.S.C. 154(b) by 557 days.

(21) Appl. No.: 11/173,484

(22) Filed: Jul. 1, 2005

(65) Prior Publication Data

US 2006/0001535 A1    Jan. 5, 2006

(30) Foreign Application Priority Data

Jul. 5, 2004  (DE) .......................... 10 2004 032 437

(51) Int. Cl.
*B60C 23/00*   (2006.01)
(52) U.S. Cl. .......... 340/447; 340/445; 340/442; 73/146; 116/34 R
(58) Field of Classification Search .......... 340/442–448, 340/686.1; 116/34 A, 34 B, 34 R; 152/152.1; 73/146
See application file for complete search history.

(56) References Cited

U.S. PATENT DOCUMENTS

2003/0001735 A1 *   1/2003   Honeck et al. ................ 340/445

FOREIGN PATENT DOCUMENTS

| DE | 10226995 | * | 5/2004 |
| DE | 10302383 | | 5/2004 |
| DE | 10226995 | | 6/2004 |
| EP | 1419908 | | 11/2003 |

* cited by examiner

*Primary Examiner* — George A Bugg
*Assistant Examiner* — Hongmin Fan
(74) *Attorney, Agent, or Firm* — Orum & Roth LLC

(57) ABSTRACT

Allocating first transmitters of a tire monitoring system, especially of a tire-pressure monitoring system having a wheel unit comprising a sensor, a first transmitter, which can be triggered, and a sending antenna on each of N wheels arranged on L axles of a vehicle according to a predetermined axle formula, further having receiving antenna on the vehicle body associated to the first transmitters and an electronic receiver and evaluation system, connected to receiving antenna by allocating an identifier characteristic of a particular wheel to its respective first transmitter, by emitting data telegrams, which contain the identifier, in response to a triggering action of second transmitters, and passing on such data telegrams to the central electronic receiver and evaluation system. The number n of the trigger transmitters is smaller than the number A of the axle positions, that each axle position is associated to a triggering range of n trigger transmitters.

18 Claims, 1 Drawing Sheet

METHOD AND DEVICE FOR ALLOCATING TRIGGERED TRANSMITTERS OF A TIRE MONITORING SYSTEM, ESPECIALLY OF A TIRE-PRESSURE MONITORING SYSTEM

BACKGROUND OF THE INVENTION

1. Field of the Invention

The present invention relates to a method for allocating first transmitters, of a tire monitoring system, especially of a tire-pressure monitoring system, having a wheel unit comprising a sensor, a transmitter and a sending antenna, on each of N wheels arranged on L axles of a vehicle according to a predetermined axle formula, further having at least one receiving antenna on the vehicle body associated to the first transmitters, and an electronic receiver and evaluation system, by association to the respective transmitter of an identifier characteristic of a particular wheel, through the emission of data telegrams, which contain the identifier, in response to the triggering action of the trigger transmitters, and by passing on such data telegrams to the central electronic receiver and evaluation system. Further, the invention relates to a device suited for carrying out that method.

The "axle formula" indicates the number of axles provided on the vehicle and the number of wheels at each of the axle positions of the vehicle. "Axle position" is to be understood as the location at which single wheels or a number of wheels, which belong together and are placed side-by-side, are arranged. If there is only a single wheel at a given axle position as is usual with automobiles, then the axle position is identical to the wheel position. In case of trucks, however, there can be provided more than one wheel at a given axle position, e. g. two wheels in case of a truck with twin wheels. In such a case there are two wheel positions at an axle position of twin wheels.

2. Description of Related Art

A method of that kind and a device for carrying out that method have been known and are used for monitoring the wheels of a motor vehicle with respect to certain given values, such as tire pressure, temperature, and the like, for example. Wheel monitoring systems of that kind must be capable of automatically detecting the position of a wheel on the axles, i.e. a mounting position of one or more wheels on a given axle. In the case of passenger cars, normally a single wheel is mounted at each axle position so that the axle position is identical to the wheel position of the respective wheel. In the case of commercial vehicles, however, two wheels (twin tires) may be mounted at one axle position of some vehicles so that two wheel positions are associated to one axle position in that case. For allocating a first transmitter to a defined axle position, one normally uses electronic wheel units that can be triggered and emit their data in response to the receipt of a trigger signal sent out by a second transmitter which is a trigger transmitter.

This is accomplished by the known method and the known device by associating one trigger transmitter to each axle position. During a learn phase, the central electronic receiver and evaluation system drives the trigger transmitters of the respective axle positions so that upon receipt of the trigger signals the electronic wheel unit associated to the driven trigger transmitter sends out its data in the form of a data telegram which is received by the at least one receiving antenna and is passed on to the central electronic receiver and evaluation unit. In order to check the source of that data telegram for plausibility, that process preferably is repeated a number of times. Upon conclusion of that process, the identity of the wheel associated to the triggered electronic wheel unit is known, i.e. its axle position has been learned.

This manner of proceeding allows building-up of a bidirectional transmission path by means of which the transmission time of the electronic wheel units can be determined by a control unit in the central electronic receiver and evaluation system. This clearly reduces the learning times of the tire monitoring system it being now possible to request a plurality of telegrams in rapid succession from each electronic wheel unit, at the beginning of a trip, so that the number of telegrams required for safely determining the correct allocation will be available within a clearly shorter period of time. In addition, when the vehicle is stopped and normal pressure conditions prevail in the tire, the electronic wheel units can remain switched off, which improves the service life of the electronic wheel units.

However, it is a disadvantage of the known method and of the known device that a separate trigger transmitter must be associated to each axle position, i.e. to each single or twin wheel on each of the L axles of the vehicle. Especially with trucks having three or more than three axles this leads to increased costs, which is a disadvantage.

Now, it is the object of the present invention to improve a method and a device of the before-mentioned kind so that the number of trigger transmitters required is smaller than the number of associated axle positions of the vehicle.

The invention achieves this object in that the number n of the trigger transmitters arranged on the vehicle is smaller than the number A of the axle positions, that each axle position of the vehicle is associated to a triggering range of at least one of the n trigger transmitters, that the trigger transmitters are so arranged and/or configured that at least one axle position is associated to the triggering range of at least two trigger transmitters, that the identifiers of the electronic wheel units that respond to a trigger signal of a particular trigger transmitter are registered by the at least one receiving antenna and are passed on to the electronic receiver and evaluation unit, and that the electronic evaluation unit calculates the axle position of a given electronic wheel unit based on the axle formula of the vehicle.

The invention achieves the objection also by a device for allocating first transmitters, which can be triggered, of a tire monitoring system, especially of a tire-pressure monitoring system, has a wheel unit comprising a sensor, a first transmitter and a sending antenna on each of N wheels arranged on L axles of a vehicle according to a predetermined axle formula, further has at least one receiving antenna on the vehicle body associated to the first transmitters, and an electronic receiver and evaluation system connected to the at least one receiving antenna, wherein allocation of the first transmitters to a defined axle position of the vehicle is effected by allocating to the respective first transmitter an identifier characteristic of the particular wheel, by emitting data telegrams, which contain the identifier, in response to a triggering action of second transmitters of the device which serve as trigger transmitters, and by passing on such data telegrams to the central electronic receiver and evaluation system. The trigger transmitters are so arranged and/or configured that at least one axle position is arranged in a triggering range of each trigger transmitter, that at least one axle position is associated to the triggering range of at least two trigger transmitters, and based on the axle formula of the vehicle, the electronic evaluation system calculates the axle position of a given electronic wheel unit by evaluation of the identifiers of the electronic wheel units responding to trigger signals of a given trigger transmitter.

On vehicles having at least three axles the invention advantageously allows allocating an electronic wheel unit to a given axle position with the aid of a number of trigger transmitters smaller than the number of the axle positions. Such a feature advantageously leads to a significant reduction in costs.

An advantageous further development of the invention provides for level evaluation of the data telegrams emitted by the individual electronic wheel units. It is an advantage of that feature that it permits easily a spatial resolution of the various wheel positions of any axle position even if multiple tires exist at a given axle position, as is the case for example with twin tire systems.

BRIEF DESCRIPTION OF THE FIGURES

Further details and advantages of the invention will become apparent from the embodiments that will be described hereafter by reference to the drawings in which.

DETAILED DESCRIPTION OF THE INVENTION

Figure 1:
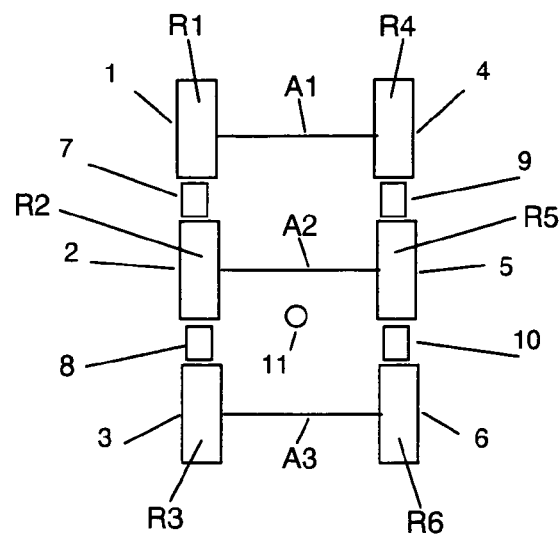
FIG. 1 shows a diagrammatic representation of a device for monitoring N=6 wheels distributed over L=3 axles.

FIG. 1 now shows a diagrammatic representation of an axle and wheel arrangement of a motor vehicle having N=6 wheels R1 to R6 distributed over L=3 axles A1-A3. The illustrated axle and wheel arrangement thus comprises six axle positions 1-6 so that—considering that no multiple tires are provided—any given axle position 1-6 is identical to the position of the wheels R1-R6, which means that a conventional method would need six trigger transmitters in this case. Each wheel R1-R6 contains an electronic wheel unit for measuring the inner pressure and temperature, for example, of the tire and for transmitting such values—if desired together with additional values from the electronic wheel unit, such as the residual service life, an identifier for the transmission mode of the first transmitter—and a specific identifier of the electronic wheel unit by radio in the form of a data telegram. The radio signals from the wheels R1-R6 are received by one antenna 11, or by more than one antenna, and the data received by the at least one antenna 11 are passed on to a central electronic receiver and evaluation system (not shown) for evaluation of the received data. Based on the specific identifier of each electronic wheel unit contained in the data telegram, the data telegram and the measured values transmitted in the data telegram, i.e. the data transmitted from the electronic wheel unit, are allocated to the respective individual wheel position. For this purpose, the central electronic receiver and evaluation system should know, which electronic wheel unit which is characterized by a specific identifier, is installed at which particular wheel position.

For this purpose there are used, the trigger transmitters 7-10. In order to achieve that the triggering process requires a number n of trigger transmitters (in the present case: four) which is smaller than the number of axle positions to be triggered (here: six) the method according to the invention advantageously provides that each of the trigger transmitters 7-10 (in the present case a number of four) is arranged in such a way that a number x of the N axle positions lies within the triggering range of any of the trigger transmitters 7 to 10. The triggering range of a trigger transmitter is the range in which an electronic wheel unit, that can be triggered, in fact will be triggered with sufficient reliability by sending out a trigger signal from the trigger transmitter. Any given trigger transmitter 7-10 will trigger those electronic wheel units on the axle positions outside its triggering range either not at all or only sporadically.

For simplicity's sake, it will be assumed in the following description that x=2 axle positions lie within the triggering range of each trigger transmitter. Of course, it is obvious to any person skilled in the art that the described method is not limited to the discussed case of x=2 axle positions, but that it is also possible to provide for a value x which is greater or equal to 3, and/or that a different number of axle positions 1-6 can be associated to any given trigger transmitter 7-10. A person skilled in the art is then in a position to easily derive from the description of the function of the device and of the method that will be provided hereafter with respect to a case of x=2 axle positions 1-6 lying within the triggering range of each trigger transmitter 7-11, the modifications he/she has to apply to the method and the device.

Thus according to FIG. 1, the axle positions 1 and 2 are found within the triggering range of the trigger transmitter 7, while the axle positions 3-6 are found outside its triggering range defined above. Correspondingly, the axle positions 2 and 3 are found within the triggering range of the trigger transmitter 8, while the axle positions 1 and 4-6 are found outside the triggering range of the trigger transmitter 8. The axle positions 4 and 5 are found within the triggering range of the third trigger transmitter 9, while the axle positions 5 and 6 are found within the triggering range of the fourth trigger transmitter 10.

As is indicated diagrammatically in FIG. 1, it is preferred with respect to the arrangement of the trigger transmitters 7 to 10 to place them as centrally as possible between neighboring axles A1-A3 so as to ensure that the field strength of the triggering signal emitted by the respective trigger transmitter 7-10 is as homogenous as possible at the axle positions 1-6 of the neighboring axles A1-A3. However, it is of course also possible to arrange the trigger transmitters 7-10 outside the positions indicated in FIG. 1 although it then has to be guaranteed that the field strength of the trigger transmitters 7-10 is sufficient for safely triggering the x electronic wheel units, that have to be triggered by the respective trigger transmitter, of the wheels arranged in the respective axle positions 1-6, and that the field strength of the trigger transmitters 7-10 is sufficiently weak at the axle positions outside their triggering range to ensure that the electronic wheel units located outside the triggering range will be triggered either not at all or at most sporadically only.

Now, in order to be able to know which electronic wheel unit, being individualized by its identifier, is installed at which axle position 1-6, the data telegrams sent out in response to the triggering process are evaluated and, preferably, assessed statistically—as will be described hereafter in more detail. That evaluation then allows the individual electronic wheel units to be allocated to different positions: The first trigger transmitter 7 emits a number of—for example ten—trigger signals in succession. The individual trigger signals are received well by the electronic wheel units at the axle positions 1 and 2 neighboring the first trigger transmitter 7, whereupon the electronic wheel units of the wheels R1 and R2 installed at axle positions 1 and 2 respond by emitting a data telegram. The axle position 3, as well as the further axle positions 4-6, lie outside the triggering range of the first trigger transmitter 7 so that the probability that any electronic wheel unit of a wheel R3-R6 installed at the axle positions 3-6 will be triggered by a trigger signal of the first trigger transmitter 7 is at least reduced and triggering will occur at most sporadically (for example when the receiving antenna of the electronic wheel unit occupies an optimum position relative to the trigger transmitter).

Accordingly, the first trigger transmitter 7 triggers the electronic wheel units of the wheels R1 and R2 installed at axle positions 1 and 2 with the result that the response signal from the electronic wheel units located at axle positions 1 and 2 will be received by the receiving antenna 11 and will be passed on to the central electronic receiver and evaluation unit. Based on the identifiers of the electronic wheel units contained in the response signal and based on the known axle formula of the vehicle, which indicates the number of wheels R1-R6 installed on the different axles A1-A3, the central electronic receiver and evaluation system now knows that the two electronic wheel units, carrying the identifiers K1 and K2, are those neighboring the first trigger transmitter 7 arranged between the first axle A1 and the second axle A2.

The same process step is then carried out with the second trigger transmitter 8 with the result that the electronic wheel units, located at the axle positions 2 and 3, of the wheels R2 and R3 are triggered with the effect that the two electronic wheel units emit their data telegram which is received by the central antenna 11 and is then passed on to the central electronic receiver and evaluation unit. The latter then knows from the axle formula that the electronic wheel units of the wheels R2 and R3 are those neighboring the trigger transmitter 8. The central electronic receiver and evaluation unit then knows that the trigger signals of the first trigger transmitter 7 and of the second trigger transmitter 8 trigger a respective electronic wheel unit, which is individualized by a given identifier K1 or K2 or K3, with the result that the respective electronic wheel unit must be located between the two trigger transmitters 7 and 8 and, thus, at the axle position 2 of the second axle A2. From that it follows immediately that the electronic wheel unit, carrying the other identifier K1, must be located at the axle position 1 of the first axle A1, and the electronic wheel unit carrying the identifier K3 must be located at the axle position 3 of the third axle A3. The described method thus permits to determine the axle positions of three electronic wheel units and, thus, of three wheels R1-R3 by means of only two trigger transmitters 7 and 8.

The positions of the remaining electronic wheel units are then determined in the same—analogous—way so that the different process steps need not be described here once more. It is thus possible to allocate six axle positions to the corresponding wheel units by means of only four trigger transmitters 7-10.

The above description relates to the ideal case that any trigger transmitter will trigger only those electronic wheel units for which it is intended. However, in practice that ideal case often cannot be realized, especially due to the fact that because of the revolution of the wheel the position of the receiving antenna of an electronic wheel unit may occupy a position in which the field strength of the trigger transmitter 7-10 is too weak so that an electronic wheel unit will not be triggered even if located within the triggering range of the trigger transmitter 7-10, with the result that the electronic wheel unit will not respond to each trigger signal by sending out a data telegram and/or that a trigger signal sent out by a trigger transmitter 7-10 will trigger an electronic wheel unit located outside its triggering range. Now, in order to permit the method, which has been described above with reference to an ideal case, to be carried out also under non-ideal conditions, it is provided that the data telegrams received are assessed statistically and any electronic wheel unit will be considered as neighboring a given trigger transmitter 7-10 and, thus, as being located within the latter's triggering range when the number of data telegrams initiated by a number of t trigger signals is higher than a given value, e.g. that in the case of t=10 trigger signals at least y=6 data telegrams, containing the corresponding identifier, will be received, or that provision is made that only the two (generally x) identifiers received most frequently will be regarded as identifiers of electronic wheel units neighboring the respective trigger transmitter 7-10.

Figure 2:
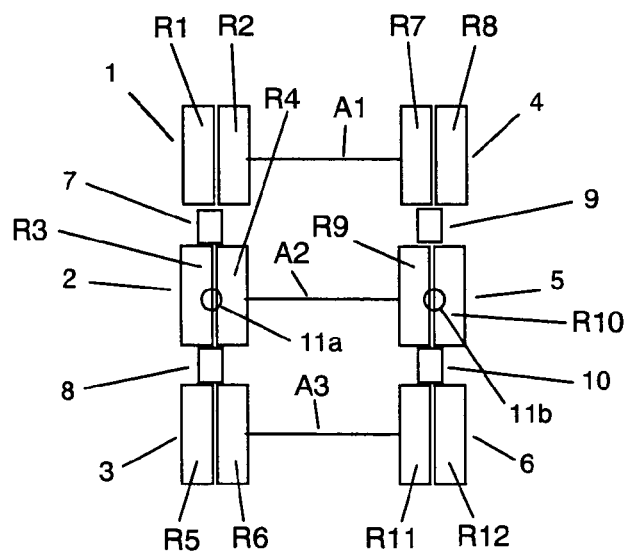
FIG. 2 shows a diagrammatic representation of an embodiment of a device for monitoring N=12 wheels distributed over L=6 axles.

FIG. 2 shows a second embodiment of a tire monitoring system where N=12 wheels R1-R6 and R7-R12 are arranged at six axle positions, distributed over L=3 axles of the vehicle, which means that two separate wheel positions exist at each axle position 1-6. In addition, two receiving antennas 11a and 11b, intended to receive data telegrams emitted by the electronic wheel units, are provided in the case of that second embodiment. Further, there are again provided the trigger transmitters 7-10, which preferably are arranged centrally between the axles A1-A3.

Thus, the electronic wheel units of the first wheels R1 and R2 of the first axle position 1 and the wheels R3, R4 of the second axle positions 2 are located within the range of the trigger transmitter 7. The wheels R3 and R4 of the second axle position 2 and the wheels R5 and R6 of the third axle position 3 are then located within the triggering range of the second trigger transmitter 8, while the wheels R7, R8 of the fourth axle position 4 and the wheels R9, R10 of the fifth axle position 5 are located within the triggering range of the third trigger transmitter 9, and the wheels R11 and R12 of the sixth axle position are located within the triggering range of the fourth trigger transmitter 10.

The second embodiment therefore differs from the first embodiment as regards its initial conditions—due to the twin tires at the axle position 1-6—in that now there are no longer x=2, but rather x=4 wheels R1-R12, with their respective electronic wheel units, arranged within the range of any trigger transmitter 7-10, which means that in the case of the second embodiment two wheels R1 and R2, R3 and R4, R5 and R6, etc., are positioned at any given axle position.

By proceeding in a manner analogous to the process of the first embodiment it is now again possible to determine which pair of wheels is located at a given axle position 1-6. Now, in order to be able to again differentiate between the two wheels at a given axle position 1-6, namely the outer and the inner wheel, respectively, one evaluates the signal level of the respective data telegrams from the electronic wheel units of the wheels R1-R12 located at any axle position 1-6. Preferably, the electronic wheel units that are triggered simultaneously will instead of transmitting their data signals in response to that transmission request simultaneously, will transmit them with a certain, maybe variable, delay in time so that any overlapping in time of the data telegrams is excluded. Level evaluation of the data signals received is then effected in the central electronic receiver and evaluation system which evaluates the signals from antennas 11a and 11b. The data telegram received from a wheel located at a greater distance from antenna 11a or 11b, respectively, for example from the wheel R1, is received weaker than the data telegram received from the nearer electronic wheel unit, for example from the electronic wheel unit of the wheel R2 at the first axle position 1. In the case of twin tires, for example, where the two twin wheels are arranged with their side walls one facing the other, for example the wheels R1 and R2, the inner wheel R2 impedes and dampens the transmission of the data telegrams from the outer wheel R1 to the antenna 11b on the opposite side of the vehicle. Accordingly, the central electronic receiver and evaluation system is able to distinguish between the signals received from the wheels R1 and R2 by comparing the intensities of the received signals, and can allocate the signals to the wheels R1 or R2 from which they are transmitted.

In conclusion, it should be noted that the method and the device described above provide an advantageous way of determining the axle positions and—if level evaluation is carried out—also the wheel positions of N wheels R1-R12 distributed over L axles A1-A3, with the aid of a number of trigger transmitters which is smaller than the number of corresponding axle positions. The reduced number of trigger transmitters required advantageously allows significant cost reductions.

The invention claimed is:

1. Method for allocating first transmitters of a tire monitoring system, said tire monitoring system comprising
a wheel unit comprising a sensor, a first transmitter, which can be triggered, and a sending antenna on each of N wheels arranged on L axles of a vehicle according to a predetermined axle formula,
at least one receiving antenna on the vehicle body associated to the first transmitters and
an electronic receiver and evaluation system, connected to the at least one receiving antenna by allocating an identifier characteristic of a particular wheel to its respective first transmitter, by emitting data telegrams, which contain the identifier, in response to a triggering action of second transmitters which serve as trigger transmitters, and by passing on such data telegrams to the electronic receiver and evaluation system,
wherein the number n of the trigger transmitters arranged on the vehicle is smaller than the number A of the axle positions,
comprising the steps of
associating each axle position of the vehicle to a triggering range of at least one of the n trigger transmitters,
arranging and/or configuring the trigger transmitters so that at least one axle position is associated to the triggering range of at least two trigger transmitters,
defining the triggering range of each trigger transmitter in such a manner that a number of x axle positions is arranged within the triggering range,
wherein the same number of axle positions is provided in each triggering range of each trigger transmitter,
registering the identifiers of the electronic wheel units that respond to a trigger signal of a particular trigger transmitter by the at least one receiving antenna and are passed on to the electronic receiver and evaluation unit, and calculating the axle position of a given electronic wheel unit based on the axle formula of the vehicle.

2. Method for allocating first transmitters of a tire monitoring system, said tire monitoring system comprising
a wheel unit comprising a sensor a first transmitter which can be triggered, and a sending antenna on each of N wheels arranged on L axles of a vehicle according to a predetermined axle formula,
at least one receiving antenna on the vehicle body associated to the first transmitters and
an electronic receiver and evaluation system, connected to the at least one receiving antenna by allocating an identifier characteristic of a particular wheel to its respective first transmitter, by emitting data telegrams which contain the identifier, in response to a triggering action of second transmitters which serve as trigger transmitters, and by passing on such data telegrams to the electronic receiver and evaluation system,
wherein the number n of the trigger transmitters arranged on the vehicle is smaller than the number A of the axle positions,
comprising the steps of
associating each axle position of the vehicle to a triggering range of at least one of the n trigger transmitters,
arranging and/or configuring the trigger transmitters so that at least one axle position is associated to the triggering range of at least two trigger transmitters,
registering the identifiers of the electronic wheel units that respond to a trigger signal of a particular trigger transmitter by the at least one receiving antenna and are passed on to the electronic receiver and evaluation unit, and
calculating the axle position of a given electronic wheel unit based on the axle formula of the vehicle,
wherein the trigger transmitters are arranged substantially centrally between neighboring axles of the vehicle.

3. The method as defined in claim 1, further comprising the step of statistically assessing the data telegrams triggered by any trigger transmitter.

4. The method as defined in claim 1, further comprising the step of evaluating the level of the data telegrams.

5. The method as defined claim 1, wherein the data telegram contains the pressure inside of the tire and/or the tire temperature as measured values to be monitored.

6. Device for allocating first transmitters, which can be triggered, of a tire monitoring system, comprising:
a wheel unit comprising a sensor, a first transmitter and a sending antenna on each of N wheels arranged on L axles of a vehicle according to a predetermined axle formula,
at least one receiving antenna on the vehicle body associated to the first transmitters, and
an electronic receiver and evaluation system connected to the at least one receiving antenna,
wherein allocation of the first transmitters to a defined axle position of the vehicle is effected by allocating to the respective first transmitter an identifier characteristic of the particular wheel, by emitting data telegrams, which contain the identifier, in response to a triggering action of second transmitters of the device which serve as trigger transmitters, and by passing on such data telegrams to the central electronic receiver and evaluation system,
the trigger transmitters are so arranged and/or configured that at least one axle position is arranged in a triggering range of each trigger transmitter,
at least one axle position is associated to the triggering range of at least two trigger transmitters, and, based on the axle formula of the vehicle, the electronic evaluation system calculates the axle position of a given electronic wheel unit by evaluation of the identifiers of the electronic wheel units responding to trigger signals of a given trigger transmitter, each trigger transmitter having a triggering range such that a number of X axle positions are arranged within the triggering range, each trigger transmitter having the same number of axle positions in each triggering range.

7. The device as defined in claim 6, in which an evaluation of the level of the data telegrams sent out by the electronic wheel units can be carried out.

8. The method as defined in claim 3, further comprising the step of evaluating the level of the data.

9. Method for allocating first transmitters of a tire monitoring system, said tire monitoring system comprising
a wheel unit comprising a sensor, a first transmitter, which can be triggered, and a sending antenna on each of N wheels arranged on L axles of a vehicle according to a predetermined axle formula, at least one receiving antenna on the vehicle body associated to the first transmitters and an electronic receiver and evaluation system, connected to the at least one receiving antenna by allocating an identifier characteristic of a particular wheel to its respective first transmitter, by emitting data telegrams, which contain the identifier, in response to a triggering action of second transmitters which serve as trigger transmitters and by passing on such data telegrams to the electronic receiver and evaluation system, wherein the number n of the trigger transmitters arranged on the vehicle is smaller than the number A of the axle positions, comprising the steps of associating each axle position of the vehicle to a triggering range of at least one of the n trigger transmitters, arranging and/or configuring the trigger transmitters so that at least one axle position is associated to the triggering range of at least two trigger transmitters, defining the triggering range of each trigger transmitter in such a manner that a number of x axle positions is arranged within the triggering range, registering the identifiers of the electronic wheel units that respond to a trigger signal of a particular trigger transmitter by the at least one receiving antenna and are passed on to the electronic receiver and evaluation unit, and calculating the axle position of a given electronic wheel unit based on the axle formula of the vehicle, wherein the trigger transmitters are arranged substantially centrally between neighboring axles of the vehicle.

10. The method as defined in claim 1, further comprising the step of statistically assessing the data telegrams triggered by any trigger transmitter.

11. The method as defined in claim 1, further comprising the step of evaluating the level of the data telegrams.

12. The method as defined claim 1, wherein the data telegram contains the pressure inside of the tire and/or the tire temperature as measured values to be monitored.

13. The method as defined in claim 10, further comprising the step of evaluating the level of the data telegrams.

14. The method as defined in claim 1 further comprising the step of statistically assessing the data telegrams triggered by any trigger transmitter.

15. The method as defined in claim 14, further comprising the step of evaluating the level of the data telegrams.

16. The method as defined claim 1 wherein the trigger transmitters are arranged substantially centrally between neighboring axles of the vehicle, further comprising the step of statistically assessing the data telegrams triggered by any trigger transmitter, evaluating the level of the data telegrams.

17. The method of claim 15 wherein the data telegram contains the pressure inside of the tire and/or the tire temperature as measured values to be monitored.

18. The device as defined in claim 6 wherein the tire monitoring system is a pressure monitoring system.

* * * * *